US008308891B2

(12) United States Patent
Drake et al.

(10) Patent No.: US 8,308,891 B2
(45) Date of Patent: Nov. 13, 2012

(54) METHOD FOR FORMING DYE SUBLIMATION IMAGES IN SOLID SUBSTRATES

(75) Inventors: Jonathan Drake, Carmel Highlands, CA (US); John Moalli, Placerville, CA (US)

(73) Assignee: Fresco Technologies, Inc., Monterey, CA (US)

(*) Notice: Subject to any disclaimer, the term of this patent is extended or adjusted under 35 U.S.C. 154(b) by 295 days.

(21) Appl. No.: 11/508,565

(22) Filed: Aug. 22, 2006

(65) Prior Publication Data

US 2007/0039682 A1 Feb. 22, 2007

Related U.S. Application Data

(60) Continuation-in-part of application No. 10/950,028, filed on Sep. 23, 2004, which is a division of application No. 10/084,262, filed on Feb. 26, 2002, now Pat. No. 6,814,831, which is a continuation-in-part of application No. 09/823,290, filed on Mar. 29, 2001, now Pat. No. 6,998,005.

(51) Int. Cl.

| | |
|---|---|
| ***B29C 65/02*** | (2006.01) |
| ***B29C 65/56*** | (2006.01) |
| ***B32B 37/02*** | (2006.01) |
| ***B32B 37/04*** | (2006.01) |
| ***B32B 37/06*** | (2006.01) |
| ***B32B 37/10*** | (2006.01) |
| ***B32B 37/14*** | (2006.01) |
| ***B32B 37/24*** | (2006.01) |
| ***B32B 37/26*** | (2006.01) |
| ***B32B 38/10*** | (2006.01) |
| ***B32B 38/14*** | (2006.01) |
| *B29C 65/18* | (2006.01) |
| *B29C 65/38* | (2006.01) |
| *B32B 38/18* | (2006.01) |

(52) U.S. Cl. ........ 156/289; 156/230; 156/240; 156/247; 428/41.7; 428/41.8

(58) Field of Classification Search .................. 156/230, 156/240, 247, 289; 428/41.7, 41.8
See application file for complete search history.

(56) References Cited

U.S. PATENT DOCUMENTS 3,061,567 A * 10/1962 Keil .............................. 428/447
3,649,332 A 3/1972 Dybvig
4,059,471 A * 11/1977 Haigh ...................... 156/244.27
(Continued)

FOREIGN PATENT DOCUMENTS

EP 0266430 A1 * 5/1998
(Continued)

OTHER PUBLICATIONS

International Search Report and Written Opinion of PCT/US2007/076388, Apr. 18, 2008.*
(Continued)

*Primary Examiner* — Sonya Mazumdar
(74) *Attorney, Agent, or Firm* — Beyer Law Group LLP

(57) ABSTRACT

A method for forming a dye sublimation image in a plastic substrate with a sheet having an image formed thereon of a sublimatic dyestuff is provided. The image on the sheet with a treatment that deposits a silicon compound is placed against a first surface of the substrate. The sheet is heated to a sublimation temperature, which causes the image of the sheet to sublimate into the substrate. The sheet is cooled to a release temperature. The sheet is removed from the substrate.

16 Claims, 9 Drawing Sheets

U.S. PATENT DOCUMENTS

| | | | | | |
|---|---|---|---|---|---|
| 4,202,663 | A | | 5/1980 | Haigh et al. | |
| 4,242,092 | A | | 12/1980 | Glover | |
| 4,314,814 | A | | 2/1982 | Deroode | |
| 4,350,545 | A | * | 9/1982 | Garabedian | 156/87 |
| 4,465,728 | A | | 8/1984 | Haigh et al. | |
| 4,662,966 | A | | 5/1987 | Sumi et al. | |
| 4,664,672 | A | | 5/1987 | Krajec et al. | |
| 4,670,080 | A | | 6/1987 | Schwartz et al. | |
| 4,670,084 | A | | 6/1987 | Durand | |
| 4,816,314 | A | * | 3/1989 | Prawdzik et al. | 156/235 |
| 4,880,667 | A | | 11/1989 | Welch | |
| 4,997,507 | A | * | 3/1991 | Meyer | 156/286 |
| 5,308,426 | A | | 5/1994 | Claveau | |
| 5,580,410 | A | | 12/1996 | Johnston | |
| 5,590,600 | A | * | 1/1997 | Hale et al. | 101/488 |
| 5,593,532 | A | * | 1/1997 | Falk et al. | 156/285 |
| 5,616,199 | A | | 4/1997 | Jurrius et al. | |
| 5,630,894 | A | * | 5/1997 | Koch et al. | 156/64 |
| 5,634,731 | A | | 6/1997 | Kita et al. | |
| 5,962,368 | A | | 10/1999 | Poole | |
| 5,997,677 | A | | 12/1999 | Zaher | |
| 6,110,316 | A | | 8/2000 | Kobayashi et al. | |
| 6,136,126 | A | | 10/2000 | Fenzi | |
| 6,149,754 | A | * | 11/2000 | Ogata et al. | 156/241 |
| 6,165,938 | A | | 12/2000 | Narita et al. | |
| 6,220,328 | B1 | * | 4/2001 | Pourmand et al. | 156/498 |
| 6,227,271 | B1 | * | 5/2001 | Pourmand et al. | 156/498 |
| 6,249,297 | B1 | | 6/2001 | Lion | |
| 6,344,103 | B1 | | 2/2002 | Cheng et al. | |
| 6,349,754 | B1 | | 2/2002 | Johnson et al. | |
| 6,392,680 | B2 | | 5/2002 | Akada et al. | |
| 6,447,629 | B1 | | 9/2002 | Thompson et al. | |
| 6,623,677 | B1 | | 9/2003 | Smith et al. | |
| 6,644,802 | B2 | * | 11/2003 | Minowa | 347/105 |
| 6,814,831 | B2 | | 11/2004 | Drake | |
| 6,835,267 | B1 | | 12/2004 | Spain et al. | |
| 6,998,005 | B2 | | 2/2006 | Magee et al. | |
| 7,025,451 | B2 | | 4/2006 | Mabbott | |
| 2001/0005603 | A1 | | 6/2001 | Kubota | |

FOREIGN PATENT DOCUMENTS

| | | | | |
|---|---|---|---|---|
| GB | 2338210 | | | 12/1999 |
| JP | 49-42373 | A | | 4/1974 |
| JP | 49041689 | A | * | 4/1974 |
| JP | 62238791 | A | * | 10/1987 |
| JP | 11-48389 | | | 2/1999 |
| JP | 11048389 | A | * | 2/1999 |
| JP | 11-199116 | | | 7/1999 |
| JP | 2000-351924 | A | | 12/2000 |
| JP | 2001-329474 | A | | 11/2001 |
| JP | 2008238812 | A | * | 10/2008 |
| KR | 20020040962 | | | 5/2002 |
| WO | WO9618509 | | | 6/1996 |
| WO | WO9962722 | | | 12/1999 |
| WO | WO 0187643 | A1 | * | 11/2001 |
| WO | WO 02079566 | A1 | * | 10/2002 |

OTHER PUBLICATIONS

Translation of JP19740419, Kimura et al. Apr. 19, 1974.*
Englsih translation of WO87/06195, Akata et al. Oct. 22, 1987.*
Family Search Report of JP 62238791A; Dec. 2011.*
International Search Report dated Aug. 7, 2002 from corresponding International Application No. PCT/US02/09784.
Supplementary Partial European Search Report dated Feb. 10, 2006.
Office Action dated Dec. 13, 2005, U.S. Appl. No. 10/950,028.
Office Action dated Feb. 7, 2006, U.S. Appl. No. 10/950,028.
Office Action dated Jun. 1, 2006, U.S. Appl. No. 10/950,028.
Office Action dated Jan. 8, 2008 for U.S. Appl. No. 10/950,028.
Office Action dated Dec. 28, 2007 from U.S. Appl. No. 11/204,830.
Japanese Office Action dated Nov. 27, 2007 from Japanese Application No. 2002-577963 with English Translation.
International Search Report dated Apr. 18, 2008 from International Application No. PCT/US07/76388.
Written Opinion dated Apr. 18, 2008 from International Application No. PCT/US07/76388.
Chinese Office Action dated Apr. 4, 2008 from Chinese Application No. 200610074147.0.
Office Action mailed Nov. 1, 2006, U.S. Appl. No. 10/950,028.
Office Action dated Jun. 12, 2008 for U.S. Appl. No. 11/204,830.
Office Action dated Jul. 9, 2008 from U.S. Appl. No. 10/650,028.
An official action dated May 30, 2008 from Mexican National Phase PCT Patent Application No. 06/08464.
Examination Report dated Jul. 7, 2008 from European Patent Application No. 02 725 420.0.
Examination Report dated Nov. 2, 2009 from Canadian Patent Application No. 2,442,070.
Japanese Office Action dated Oct. 6, 2009 from Japanese Patent Application No. 2008-045777.
Office Action dated Dec. 22, 2008 from U.S. Appl. No. 11/204,830.
Japanese Office Action dated Oct. 24, 2008 from Japanese Application No. 2002-577963.
Canadian Exam Report dated Dec. 4, 2008 from related Canadian Application No. 2,442,070.
An official action dated Nov. 21, 2008 from Mexican National Phase PCT Patent Application No. 06/08464.
Office Action dated Jan. 12, 2009 from U.S. Appl. No. 10/950,028.
First Examination Report dated Feb. 12, 2009 from Indian Patent Application No. 1147/KOLNP/2003.
Office Action dated Mar. 25, 2009 from U.S. Appl. No. 11/204,803.
Final Office Action dated Jun. 23, 2009 from U.S. Appl. No. 10/950,028.
Office Action dated Oct. 1, 2009 from U.S. Appl. No. 11/204,830.
Notice of Allowance dated Jun. 4, 2010 from U.S. Appl. No. 11/204,830.
Final Office Action dated Jul. 6, 2010 from U.S. Appl. No. 10/950,028.
Chinese Office Action dated Dec. 11, 2009 from Chinese Patent Application No. 200610074147.0.
Office Action dated Feb. 5, 2010 from U.S. Appl. No. 10/950,028.
Office Action dated Feb. 11, 2010 from Australian Patent Application No. 2007249071.
Office Action dated Jun. 23, 2010 from Mexican Patent Application No. 08/10181.
Examiner's Report dated Sep. 10, 2010 from Canadian Patent Application No. 2,442,070.
Office Action dated Feb. 22, 2011 from Australian Patent Application No. 2007249071.
Office Action dated Nov. 30, 2011 from Chinese Patent Application No. 200610074147.0.
Office Action dated Jul. 18, 2007 for related U.S. Appl. No. 11/204,830.
European Office Action dated Apr. 26, 2007 for related European Patent Application No. 02725420.0.
Japanese Office Action dated Jul. 24, 2007 for related Japanese Application No. 2002-577963 with English Translation.
Office Action dated Jul. 24, 2007 for related U.S. Appl. No. 10/950,028.

* cited by examiner

METHOD FOR FORMING DYE SUBLIMATION IMAGES IN SOLID SUBSTRATES

CROSS-REFERENCE TO RELATED PATENT APPLICATIONS

This application is a continuation-in-part of application Ser. No. 10/950,028, filed Sep. 23, 2004, which is a divisional of application Ser. No. 10/084,262, which is now U.S. Pat. No. 6,814,831 filed on Feb. 26, 2002 and issued on Nov. 9, 2004, which is a continuation-in-part of application Ser. No. 09/823,290, which is now U.S. Pat. No. 6,998,005 filed on Mar. 29, 2001 and issued on Feb. 14, 2006, and claims priority therefrom and which are all incorporated by reference in their entirety.

FIELD OF THE INVENTION

The present invention relates to the formation of images within solid sheets of plastic.

BACKGROUND OF THE INVENTION

From the advent of plastics, users and manufacturers thereof have sought workable means for imprinting or forming images thereon. Prior imaging technologies suitable for use on other materials, for instance metals, wood, and the like, have not generally met with success when used to perform permanent imaging on plastics. Examples of such prior imaging technologies include, but are not limited to, paints, decals, lacquers, and dyes. In general, the problems associated with utilizing prior imaging or marking technologies center on certain chemical and physical properties of plastics in general.

One of the great advantages of plastics is that they can be formed into complex shapes having inherently very smooth surfaces. While this is an advantage in the manufacture of such plastic objects, the extremely smooth and often chemically resistant nature of plastic surfaces renders the application thereto of paints and the like less than satisfactory. Many paints, for instance enamels, when applied to plastics, tend to flake or peel when the plastic is flexed or when the image is subjected to physical distress, such as abrasion or temperature change.

In searching for a methodology for forming permanent, abrasion-resistant images in sheet plastics, workers in this field have noted that plastics tend to be molecularly similar to certain fabrics, which are imaged utilizing a dyeing process known as "dye sublimation". According to known dye sublimation processes, an image, for instance a decorative design, is formed of sublimation printing inks on a dye carrier, sometimes also referred to as a transfer paper or auxiliary carrier or sheet. Sheets are often, but not exclusively, formed of paper. Printing the image on the sheet is carried out by any of several known printing methods including, but specifically not limited to, offset or rotary printing methods. The print images formed on the sheet are transferred by sublimation, also called transfer printing, from the dye carrier to the textile or fabric, which is to be decorated with the design.

There are several known dyestuffs suitable for use with dye sublimation printing techniques. The actual dyestuff or dye carrier utilized is not essential to the principles of the present invention, provided that the dyestuff is capable of sublimation. This is to say that the dyestuff sublimates directly to the vapor state from the solid state upon the application of heat. One type of printing ink suitable for sublimation printing is prepared from sublimable dyestuffs utilizing binders and oxidation additives. The term "sublimable" is defined herein to mean capable of sublimation.

Currently, to form a dye sublimation image in a textile, the printed dye carrier is placed with its color-imprinted side on the textile face to be imprinted and is thereafter heated. As soon as the dyestuffs reach a temperature of about 170-220° C., those dyestuffs sublime into the textile and the desired image is thereby formed in that textile.

From the foregoing discussion, it will be appreciated that one of the advantages of dye sublimation printing is that the image is actually formed within the structure of the textile, or substrate, on which it is imprinted. This is in direct contrast to most printing techniques, wherein the image is formed solely on the surface of the substrate. While surface-formed images are completely suitable for many applications, they are less than optimal for others. By way of illustration, in the preceding discussion of dye sublimation images formed in textiles, it will be appreciated that if a textile is subjected to substantial wear, as is a carpet, an image formed solely on the surface of that carpet, or on the surface of the individual carpet fibers, will tend to wear quickly.

It will further be appreciated that most inks suitable for forming surface images tend to be opaque. Again, this is suitable for many applications. However, where it is desirous that the resultant article has a lustrous or translucent property, the use of such opaque inks precludes the desired translucent image.

U.S. Pat. No. 3,649,332 to Dybvig discloses an early attempt at transfer printing of plastics. According to '332, a photo-sensitive dye carrier having an image formed thereon is placed against a porous paper temporary receptor sheet on a vacuum platen and sufficient vacuum is established to hold the two sheets in close contact and in fixed position. The transfer sheet has a dye coating on the surface contacting the receptor sheet and a photoconductive zinc oxide coating on the outer surface. The outer surface is exposed to a color separation light image from a positive color original, to impart a latent image.

A conductive roller carrying a coating of conductive radiation-absorptive toner particles at a high potential is passed over the exposed surface to deposit toner at the non-light-struck areas. The surface is then briefly exposed to intense infrared radiation causing transfer of dye to the receptor at the infrared absorptive toned areas. The vacuum is then released, and the photosensitive sheet is removed and replaced with a second photosensitive sheet carrying a second dye, and the process is repeated utilizing an appropriate color separation filter. This process is again repeated using a third filter and photosensitive sheet to produce a full three-color intermediate.

One or more portions of the intermediate are then cut from the sheet. These segments are placed against a transparent dye-receptive film in a desired arrangement, and over them is placed a paper dye source sheet having a blue dye coating as previously described, but minus the photoconductive coating of the transfer sheet. The three layers are pressed together and briefly heated. Thereafter the film is removed and is found to retain a brilliantly clear, full-color copy of the detail sections on an equally clear blue background.

U.S. Pat. Nos. 4,059,471, 4,202,663, and 4,465,728 to Haigh, or Haigh deceased et al. detail methodologies for forming dye transfer images in plastic surfaces, especially thin films. These several patents flow either directly from or as a divisional or continuation-in-part of U.S. patent application Ser. No. 540,383 filed Jan. 13, 1975. Each of these patents utilizes a dye transfer process for forming a dye pattern on a dye receptor plastic web, most especially thin films of from 2 to 20 mils in thickness, by interposing a carrier web, for instance a polyolefin carrier web, between the dye receptor plastic web and a transfer web containing dispersed dyes. Thereafter, the several webs are pressed together in close contact and are heated to a sublimation temperature suitable for the dyes, and the several webs are maintained at the sublimation temperature until a substantial portion of the dyes has sublimed and transferred from the transfer web through the polyolefin web to the dye receptor web. Thereafter, the several webs are cooled below the softening temperature of the dye receptor web, and the dye receptor web is separated from the other webs.

U.S. Pat. No. 4,242,092 to Glover teaches a method of sublimatic printing on air-permeable sheet structures, such as carpets or tiles. According to '092, an air-permeable sheet structure is imprinted by placing an air-permeable printing foil carrying on one side thereof a sublimatic dyestuff in a face-to-face relationship, and in close proximity, with the air-permeable sheet structure. The side of the foil having the dyestuff imprinted thereon is placed in contact with the air-permeable sheet structure, and the foil is heated at a temperature and for a period of time suitable to vaporize the dyestuff. At the same time, a gas or vapor pressure differential is applied so as to create a flow of air from a space above the foil, and through both the foil and the sheet structure, thereby causing the dyestuff vapor to flow into the sheet structure and to form an image therein.

U.S. Pat. No. 4,662,966 to Sumi et al. teaches an apparatus for transfer printing a plurality of articles, for instance typewriter keys, which are held on a plane in rows and then heated. '966 discloses that this apparatus further includes conveyors for conveying the plurality of articles to a heating outlet, the heating outlet having infrared radiation heaters provided inside. The apparatus further includes a holding device for holding the articles at a predetermined position with respect to the article holder. Another holder is designed to hold a transfer sheet at a second predetermined position. The transfer sheet has a pattern layer formed thereon of thermo-diffusable dye. There is also provided a means for pressing the transfer sheet against the articles so that the pattern is transfer-printed on the articles, and a conveyor for conveying the article holder with the plurality of articles thereon through the heating apparatus and the various holding devices.

U.S. Pat. No. 4,664,672 to Krajec et al. teaches a method for transfer printing onto objects made of plastic, or having a plastic surface coating, by pressing a thin dye carrier on the surface to be printed during the dye transfer process. This is affected by means of super-atmospheric gas pressure, whereby the surface is kept at a temperature below the thermoplastic range of the plastic object. According to the methodology taught by '672, a dye carrier, for instance a paper dye carrier, is pre-dried below the sublimation temperature of the ink. The dye carrier is clamped, for instance in a spectacle frame in close proximity above but not touching the surface to be printed. Thereafter, a gas under pressure is applied to the backside of the carrier, which gas exerts a slight super-atmospheric pressure directly or indirectly against the backside of the dye carrier, pressing the carrier against the object. Thereafter, a heat source, for instance a heat radiator, is placed so that its radiation is directed toward the backside of the dye carrier.

U.S. Pat. No. 5,308,426 to Claveau teaches a process for forming sublimation images on objects, evidently irregular non-planar objects, by forming an "ink support" from a material which is both extensible and air permeable and which will conform to the shape of the object. This ink support is used to envelop the object, which is then placed in a vacuum machine. The vacuum machine, with the ink support inside, is then introduced into a heated space, causing transfer of the decoration over the whole surface of the object to be decorated. Examples of extensible air-permeable materials suitable as ink carriers for utilization in the '426 invention include woven fabrics, knitted fabrics, and sheets of non-woven material.

U.S. Pat. No. 5,997,677 to Zaher teaches a methodology for applying a colored decorative designed on a plastic substrate by heating the carrier and then placing the carrier in contact with the substrate by air suction, such that a subpressure results between the carrier and the substrate. Thereafter, an inhomogeneous exposure of infrared radiation is directed to the carrier in correspondence with the prevalent color portion of the dyestuff to which the radiation is applied.

Many of the known dye sublimation printing methodologies applied to solid plastics are so sensitive to variations in pressure, temperature, dye lot, substrate lot, and other manufacturing variables, that at least one inventor has directed his inventive efforts solely to the task of pre-conditioning a plastic substrate for dye sublimation printing. This pre-conditioning is taught and explained in U.S. Pat. No. 5,580,410 to Johnston.

One of the problems of the processes in some of the above described references is that they are slow. An imaging process which requires an extended period of time to successfully form an image, or which requires a large number of complex and delicate steps to effect, may result in a successfully imaged flat plastic sheet, but one whose imaging is so expensive as to render it commercially non-viable. Moreover, some of the previous imaging processes are so sensitive to temperature variations that very slight changes in processing temperatures result in unacceptable images or destroyed substrates.

In addition, some of the above described processes have failed to yield the desired result is closely related to some of these process variables previously discussed. One particularly aggravating shortcoming of many prior dye sublimation imaging processes is that, in order to form the dye sublimation image in a solid plastic substrate, that substrate must have its temperature elevated above its thermoplastic limit. In many cases, this results in substantial liquefaction of the substrate, with attendant unwanted adhesion of the dye carrier to the now liquefied and sticky substrate. This, of course, results in a substrate having at least a portion of the dye carrier adhered thereto, often permanently. Even where it is possible to scrape the adhered dye carrier from the cooled substrate, this scraping not only results in a poor surface finish, but also requires significant cost in terms of additional man-hours to effect.

Some of the previously discussed inventions, in order to obviate the unwanted adhesion of dye carriers to sticky substrates, have relied upon placing some material between the substrate and the dye carrier. Examples of these materials include parting compounds, such as talcum, or permeable webs. The introduction of such parting or separating materials may preclude, in some instances, the unwanted adhesion of the dye carrier to the substrate, but this is done with significant degradation of the imaged article. These methodologies are admitted to cause degradation in surface finish, image resolution, or image registration on the substrate. For thermoplastic substrates, these problems are more significant, since it has been found that thermoplastic substrates are more likely to stick to a paper sheet dye carrier.

In addition, when applied to solid plastic sheets, known dye sublimation imaging processes tend to shrink, warp, and distort those sheets. While the degree of shrinkage, warping, and distortion varies from process to process and substrate to substrate, these defects, encountered utilizing known dye sublimation imaging technologies, result in anything from mildly rumpled surfaces to wildly distorted sheets having all the planarity of potato chips. Since the object of dye sublimation imaging of solid plastic sheets is to form an image within the sheet while retaining its substantially planar nature in an un-shrunken, un-warped and distortion-free state, none of the known processes can be said to be fully successful. Moreover, one or more of the technical performance specifications of plastic sheets imaged by other dye sublimation processes are often lost by subjecting the sheets to the process. These technical performance specifications include, but are not limited to, shrinkage, impact resistance, dimensionality, and mechanical strength.

What is clearly needed is a methodology for forming a durable, clear, sharp image in a solid, flat sheet of plastic by means of a dye sublimation process that results in an unshrunken, un-warped, distortion-free plastic sheet which retains all of the original plastic sheet's technical performance specifications.

In addition, it is desirable to provide such sublimated images in thermoplastic substrates.

SUMMARY OF THE INVENTION

The present invention provides a method for forming a dye sublimation image in a plastic substrate with a sheet having an image formed thereon of a sublimatic dyestuff is provided. The image on the sheet with a treatment that deposits a silicon compound is placed against a first surface of the substrate. The sheet is heated to a sublimation temperature, which causes the image of the sheet to sublimate into the substrate. The sheet is cooled to a release temperature. The sheet is removed from the substrate.

In another manifestation of the invention a method for forming a dye sublimation image in a plastic substrate is provided. A sheet of paper is treated with a treatment that deposits a silicon compound. An image is placed on the treated sheet of paper. The image on the sheet with a that treatment that deposits a silicon compound is placed against a first surface of the substrate. The sheet is heated to a sublimation temperature, which causes the image of the sheet to sublimate into the substrate. The sheet is cooled to a release temperature. The sheet is removed from the substrate.

These and other advantages of the present invention will become apparent upon reading the following detailed descriptions and studying the various figures of the Drawing.

BRIEF DESCRIPTION OF THE DRAWING

For a more complete understanding of the present invention, reference is made to the accompanying Drawing in the following Detailed Description of the Invention. In the drawing.

Figure 1:
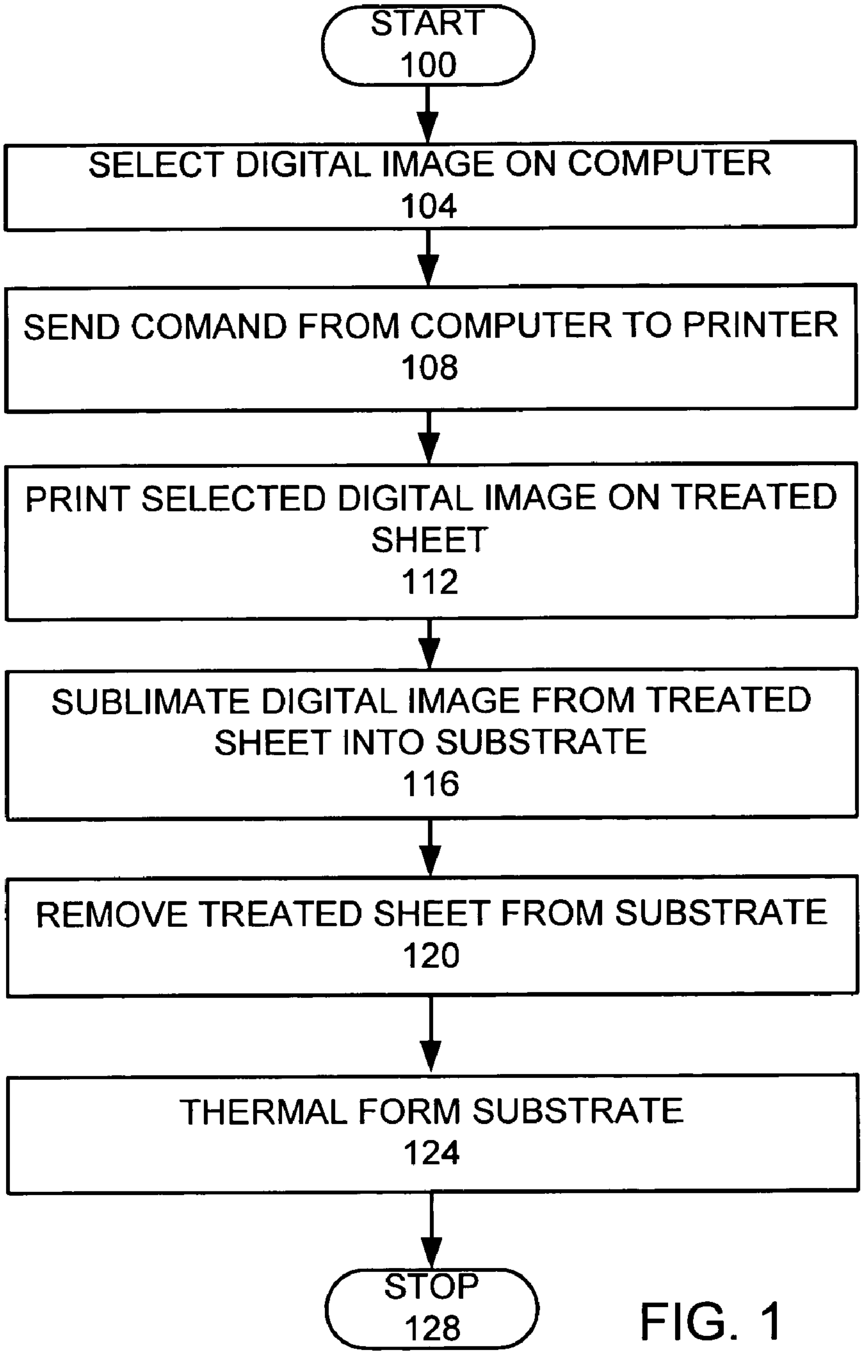
FIG. 1 is a flow chart of an embodiment of the invention.

Reference numbers refer to the same or equivalent parts of the invention throughout the several figures of the Drawing.

DETAILED DESCRIPTION OF THE INVENTION

The succeeding discussion centers on one or more preferred embodiments of the present invention, implemented by a number of components. Those having skill in the art will understand that, where the embodiments enumerated herein specify certain commercially available components, these are by way of example. The principles of the present invention are capable of implementation in a wide variety of configurations and these principles specifically contemplate all such embodiments.

While the succeeding discussion is directed to the dye sublimation imaging of plastic sheets and the like, the principles of the present invention may advantageously be applied to the dye sublimation imaging of a wide variety of man-made and naturally occurring sheet material substrates, including but specifically not limited to metals, stone, wood, waxes, polymers, monomers, resins, textiles, fabrics, glasses, minerals, leather, and composites thereof. The principles of the present invention specifically contemplate all such applications.

FIG. 1 is a flow chart of a process used in an embodiment of the invention. A digital image is selected on a computer (step 104).

Figure 2A:
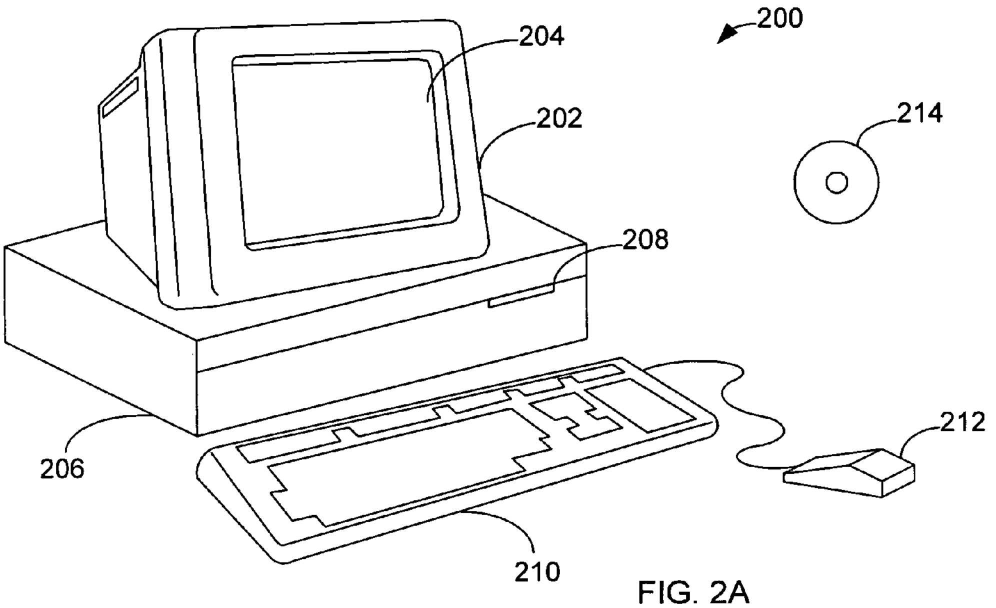
FIGS. 2A and B are schematic views of computers that may be used in the embodiments of the invention.
Figure 2B:
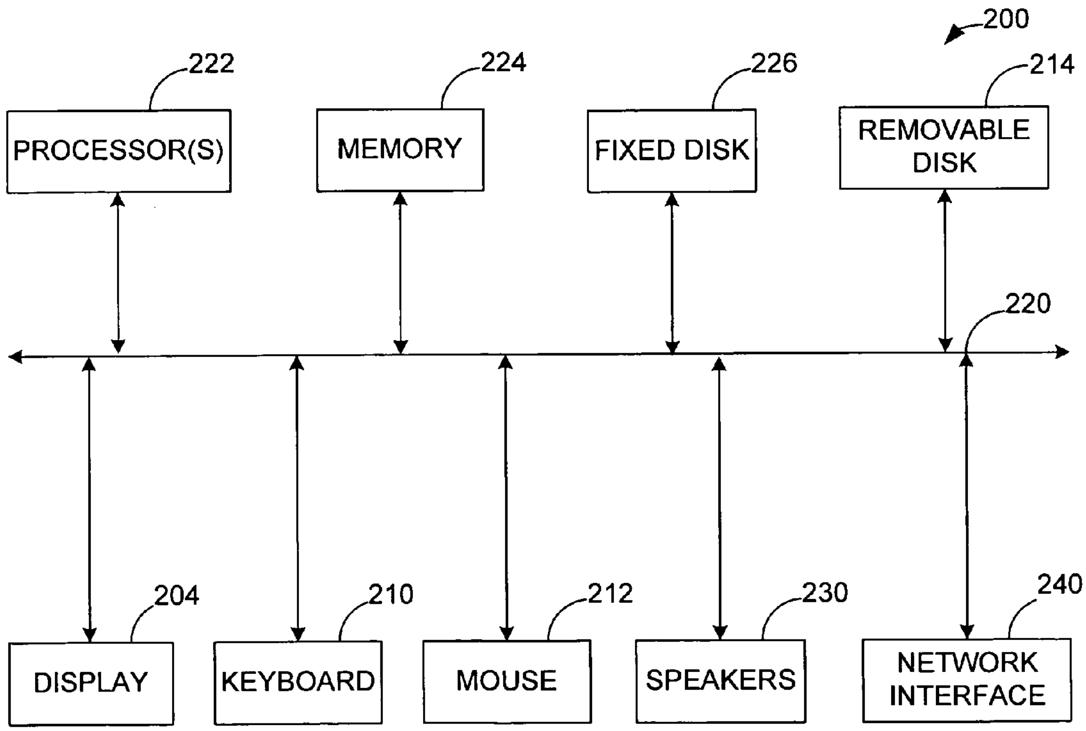

FIGS. 2A and 2B illustrate a computer system 200, which is suitable for implementing embodiments of the present invention. FIG. 2A shows one possible physical form of the computer system. Of course, the computer system may have many physical forms ranging from an integrated circuit, a printed circuit board, and a small handheld device up to a huge super computer. Computer system 200 includes a monitor 202, a display 204, a housing 206, a disk drive 208, a keyboard 210, and a mouse 212. Disk 214 is a computer-readable medium used to transfer data to and from computer system 200.

FIG. 2B is an example of a block diagram for computer system 200. Attached to system bus 220 is a wide variety of subsystems. Processor(s) 222 (also referred to as central processing units, or CPUs) are coupled to storage devices, including memory 224. Memory 224 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable type of the computer-readable media described below. A fixed disk 226 is also coupled bi-directionally to CPU 222; it provides additional data storage capacity and may also include any of the computer-readable media described below. Fixed disk 226 may be used to store programs, data, and the like and is typically a secondary storage medium (such as a hard disk) that is slower than primary storage. It will be appreciated that the information retained within fixed disk 226 may, in appropriate cases, be incorporated in standard fashion as virtual memory in memory 224. Removable disk 214 may take the form of any of the computer-readable media described below.

CPU 222 is also coupled to a variety of input/output devices, such as display 204, keyboard 210, mouse 212, and speakers 230. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 222 optionally may be coupled to another computer or telecommunications network using network interface 240. With such a network interface, it is contemplated that the CPU might receive information from the network, or might output information to the network in the course of performing the above-described method steps. Furthermore, method embodiments of the present invention may execute solely upon CPU 222 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

The digital image may be selected from a library of images stored on the computer readable media. The computer may also have software that allows selection and alterations of the digital image to provide a customized digital image.

Figure 3:
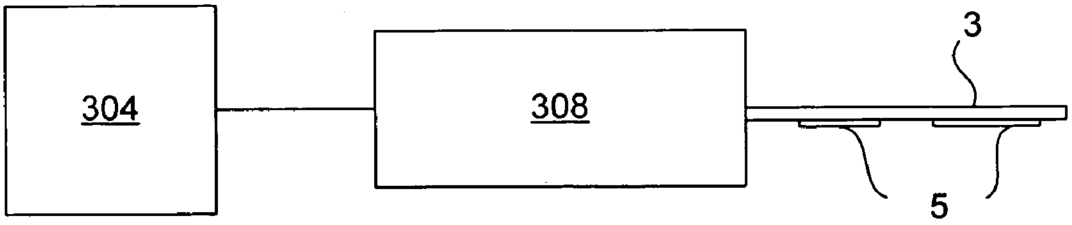
FIG. 3 is a schematic view of a computer and printer used for printing on a substrate film.

A command is sent from the computer to the printer to print the selected image (step 108). FIG. 3 is a schematic illustration of a computer 304 connected to a printer 308. Generally, computer printers such as inkjet printers and laser printers receive a command where a digital image is represented by computer data, which is interpreted by the printer to print the digital image. Such data may represent pixel points or raster points or may be a vector format. The printer 308 prints the selected digital image 312 on a treated sheet 316 (step 112). The printer 308 uses sublimation dyes to print the digital image 5 on the treated sheet 3. In the preferred embodiment, the treated sheet is a sheet treated with a treatment, which applies a layer of silicon compound material, such as and preferably silicone or organosilane, on the sheet. More preferably, the sheet is a paper based sheet. In this embodiment, the treated sheet 3 is provided in separate sheets. In another embodiment, the treated sheet may be a continuous sheet on a roller.

In an example of a treated sheet, the sheet is paper made from cellulose fibers, which are preferably natural fibers. In this example, the release properties of the paper surface are modified by silicone, or organosilane, organofluorine, long chain amide, PTFE, or other internal/surface additives, which will facilitate release of the paper from thermoplastic substrates. Some thermoplastics, such as acrylics, have a greater propensity to adhere to the transfer paper than others do.

In a preferred embodiment, a surface treatment that deposits a silicon compound was used to aid transfer paper release from the target plastic substrate after image transfer. Given that the dispersion dye/inks printed on the paper was water-based, the silicon compound concentration cannot be too high, as the ink may not wet the surface during printing. A silicone emulsion containing Polydimethylsiloxane (PDMS) was used in this embodiment. In other embodiments, other generic a surface treatments that deposit silicon compound variations would also be effective.

In an example, a low level of organosilicone at the surface functions as a release layer. This layer may be applied using a standard Meyer Rod Coater. Many other methods for coating paper would also be effective including screening, rotary drum, etc. The paper sample prepared for ink-jet printing, offset printing, roto-gravure printing or other printing methods is then finish coated with silicone as the Meyer rod is drawn across the paper in a roll-to-roll process. The paper is coated and then dried. A dry basis weight add-on of organosilicone can be determined by drying the prepared sample, then weighing the sample, then treating the sample with silicone in a rod coating process, then redrying the sample and computing the add on of silicone chemistry.

Very low levels of a surface treatment that deposit a silicon compound into the paper appear effective, however the add-on level may vary depending upon the substrate thermoplastic from which the paper is engineered for release. The dry weight of a treatment that deposit a silicon compound with respect to the weight of the paper is preferably 0.05% to 5.0% or more, which can be workable under different circumstances with image transfers designed for a variety of different thermoplastic substrates.

When ESCA (Electron Spectroscopy for Chemical Analysis) tests were performed on paper samples after treatment. Organosilicone functionality was detected on both surfaces of the paper.

Paper may be routinely prepared for functionality in various printing methods with additives, coatings, fillers, sizing agents and other functional chemistry.

Water receptive or swellable polymer coatings for inkjet printing papers are well understood and have been in use for dye-based ink sets. Typical ink formulations are water based and contain hydrophilic organic co-solvents. As the pico-liter sized ink droplets hit the coating surface during printing, the carrier solvents are rapidly absorbed into the local hydrophilic polymer structure and retained via hydrogen bonding.

Sub-micron aluminosilicate mineral particles are associated with the sizing around the individual cellulose fibers. Clays and other finely divided minerals have long been used in paper making.

Hexacoordinate Zirconium ion ($Zr4+$) is added to paper sizing and coatings as an "insolubilizer" to provide water resistance. The small radius of the tetravalent zirconium ion provides a high charge to radius value that allows it to make strong and durable ionic bonds between the carboxylate groups of Carboxymethyl Cellulose. The zirconium is normally added as ammonium zirconium carbonate or potassium zirconium carbonate. In aqueous solution, zirconium compounds from oligomers with oxygen bridges between zirconium atoms. Hence, the zirconium can function as a cross-linker tying together multiple polymer chains.

In addition to water fastness, zirconium additives improve dot resolution in coatings designed for ink-jet printing. The improvement is thought to result from the association interactions between the additive and the dye/ink. Many of the water soluble disperse dyes have sulfonic acid groups. At neutral pH, the majority of these functional groups exist as sulfonates (R—SO3) which will coordinate more strongly with zirconium ion complexes and carboxylates (R—COO). Hence, the zirconium compounds could be thought of as mordants or fixatives for negatively charged dyes. As a result, "dot gain" or lateral diffusion of the dye molecules is minimized and dye molecule concentration would be localized in the CMC coating.

A CMC (Carboxymethyl cellulose) additive is often used in the case of ink jet printing. More specifically a Sodium Carboxymethyl Cellulose (NaCMC) additive can be functional. Hydroxyethyl Cellulose (HEC), carboxymethyl hydroxyethyl cellulose (CMHEC), blends amongst this group and other polar polymers may be effective as well.

Such additives reduce spreading of the ink as it is applied to the paper and creates a more uniform planarity in the cellulosic structure of the paper. The invention provides a release agent finishing of papers that have already been pre-prepared for use in a variety of printing methods including inkjet, offset and rotogravure, rotary screen, etc. Each of these systems might require different additives, coatings, fillers, sizing agents and other functional chemistry before the release agent finishing is done. In another embodiment, the release agent additives may be added simultaneously with another functional chemistry as described above.

Figure 4:
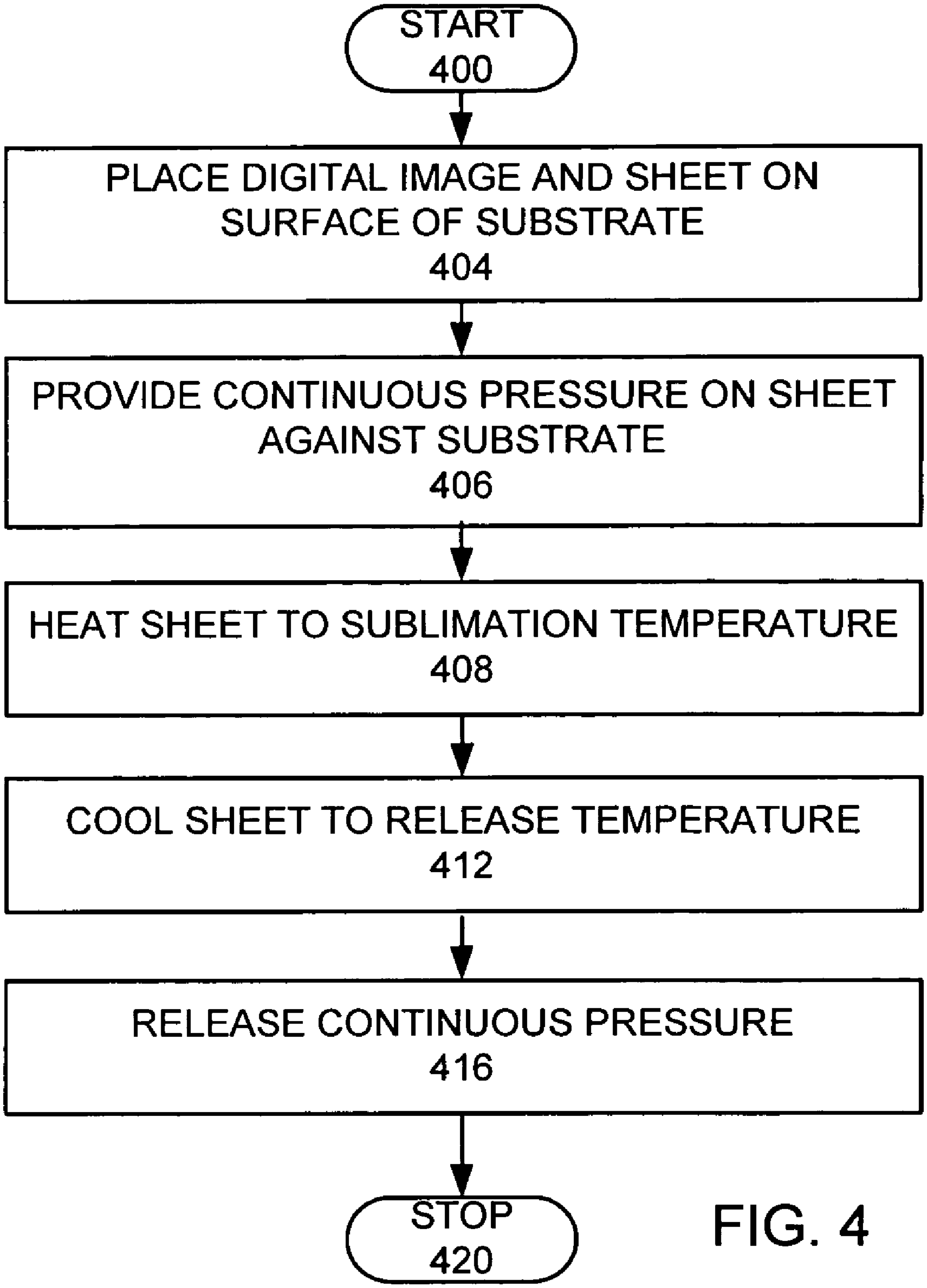
FIG. 4 is a flow chart of a step of sublimating a digital image from a treated sheet into a substrate.

The digital image is sublimated into a substrate (step 116). FIG. 4 is a flow chart of a process that is used for sublimating the digital image into a substrate according to one embodiment of the invention. The digital image and sheet treated with a release agent are placed on a surface of a substrate (step 404). Preferably, the substrate is a thermoplastic, since there is a difficulty in removing sheets of paper from thermoplastic after heat and pressure is applied and since thermoplastics are desirable for thermo forming. Preferably, the thermoplastic is at least one of ABS (Acrylonitrile Butadiene Styrene), PVC (Polyvinyl chloride), PVF (PolyVinyl Fluoride), PET (Polyethylene Terephthalate), PBT (Polybutylene terephthalate), polyesters, polycarbonates, acrylic alloys, thermoplastic Urethane, Lexan™ by GE, Valox™ by GE, Atoglas Solar Kote™, Plexiglas™, Tedlar™ by Dupont, and Korad™ Polymer Extruded Products (Spartech). A continuous pressure is provided to press the treated sheet against the substrate (step 406). The treated sheet is heated to a sublimation temperature (step 408), which is sufficient to cause sublimation of the digital image from the treated sheet into the substrate. The treated sheet is cooled to a release temperature (step 412), which is sufficient to allow easy removal of the treated sheet from the substrate. The continuous pressure is released (step 416). The treated sheet is then removed from the substrate (step 120).

Figure 5A:
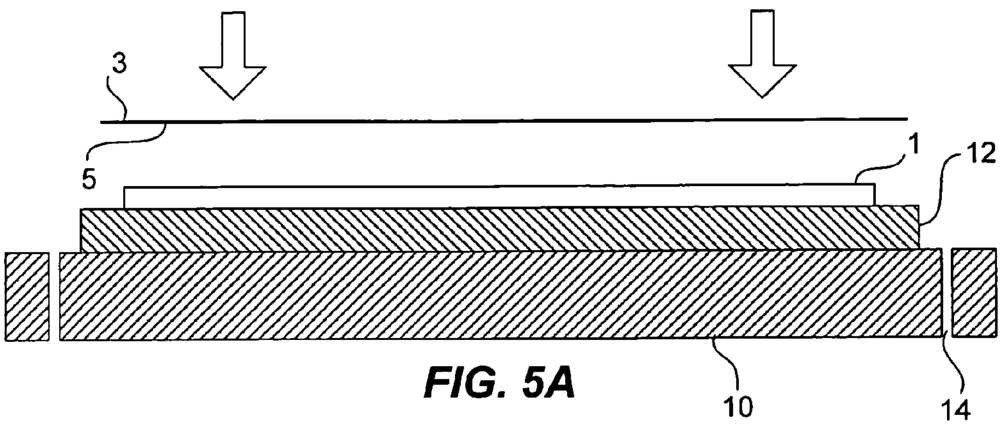
FIGS. 5A-H are cross-sectional views through a platen assembly according to the present invention, demonstrating the method thereof.

FIGS. 5A through 5H, illustrates an apparatus that may be used to perform the sublimation of the digital image (step 116) in an embodiment of the invention, as shown in FIG. 4. At FIG. 5A is shown a platen 10, having superimposed thereon a passive cooling device 12. The principles of the present invention specifically contemplate the utilization of either or both active and passive cooling devices. Platen 10, in one embodiment of the present invention, is a flat aluminum plate transfixed by a plurality of vacuum orifices 14. Vacuum orifices 14 are further connected to a vacuum system. Placed atop passive cooling device 12, for purposes of forming a dye sublimation image therein, is substrate 1. In order to form the dye sublimation image, treated sheet 3, having an image 5 imprinted thereon utilizing the previously discussed dye sublimation inks, is placed atop substrate 1 (step 404).

The passive cooling device 12 of this embodiment of the present invention consists of a panel having an extremely low thermal mass, for reasons, which will be later explained. One embodiment of the present invention contemplates the utilization of a hex-cell aluminum-cored composite sandwich panel having glass-reinforced plastic upper and lower surfaces. One such panel suitable for implementation as passive cooling device 12 is a Fiber-Lok No. 2330 sandwich panel available from Burnham Composites, Wichita, Kans. According to this embodiment of the present invention, passive cooling device 12 is of smaller surface extent than platen 10, but is at least as broad in extent as the substrates, which will be processed on it. This is necessary in order that there be at least some of the plurality of vacuum orifices 14 available to form a vacuum path for membrane 16, as will be subsequently explained.

Figure 5B:
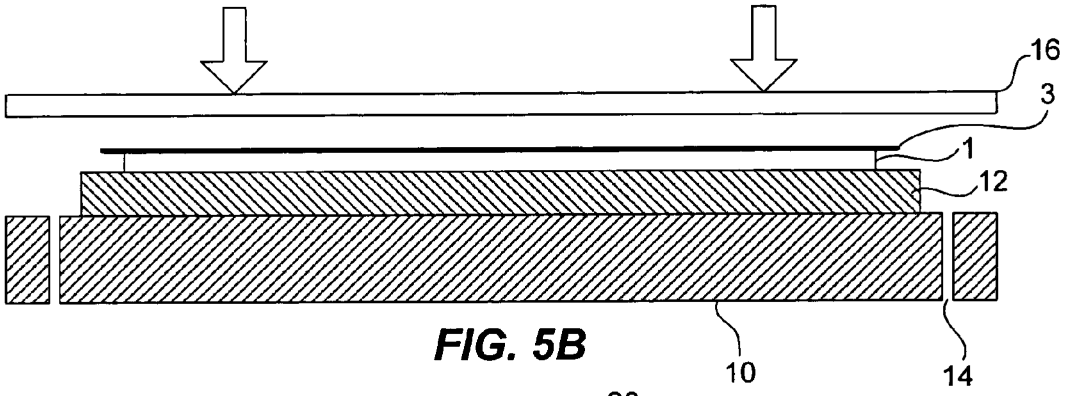

Referring now to FIG. 5B, membrane 16 is applied over the stack comprising cooling device 12, substrate 1, and treated sheet 3. Membrane 16 further overlaps at least a portion of platen 10. Membrane 16, for ease of handling, may be fitted to a spectacle frame, not shown in this figure. Membrane 16 should be capable of forming a substantially airtight seal for purposes of clamping the substrate-sheet stack together in close proximity. Membrane 16 should also have sufficient strength to prevent the warping of substrate 1 during the thermal events which constitute one dye sublimation cycle and which enable dye sublimation imaging and sheet removal, as will be later explained.

Other properties desirable of membrane 16 are that it is substantially chemically compatible not only with substrate 1 and the sublimatic dyes imprinted on sheet 3, but also with any byproducts out-gassed from substrate 1 or sheet 3 during dye sublimation imaging.

In one embodiment of the present invention, the lower surface of membrane 16 is lightly textured to provide a continuous vacuum channel across the interface between membrane 16 and sheet 3 without forming bubbles between the membrane and sheet. These bubbles would preclude even clamping of sheet 3 to substrate 1. This texture also serves as a vacuum release and as a bleeder to trail off the vacuum when it is no longer needed for clamping.

Moreover, in order to smoothly mold and flow over the several elements of the cooling device-substrate-sheet stack, as well as to platen 10, it is desirable that membrane 16 be formed of a flexible material. When used on sheet-substrate-cooling device stacks having significant vertical extent, for instance greater than about one inch in thickness, it further desirable that the membrane be formed of an elastomeric material to more smoothly mold and flow over these several elements. As the imaging process taught herein utilizes rapid temperature changes, as well as sustained periods of temperatures up to 600° F., it is also required of the membrane that it be not only heat-resistant, but that it be capable of withstanding repeated thermal cycles between higher and lower temperatures without hardening, cracking, loss of structural integrity or loss of any of the previously discussed properties.

From the foregoing discussion, it will be appreciated that a number of materials are suitable for membrane 16. Examples of such materials include, but are specifically not limited to, vulcanized rubbers, silicones, butyl rubbers, polymers, chloropolymers, fluoropolymers, and other natural or man-made elastomeric sheets. Membrane 16 is brought into substantially continuous contact with sheet 3, and covers substantially all of the plurality of vacuum orifices 14 not previously covered by passive cooling device 12.

Figure 5C:
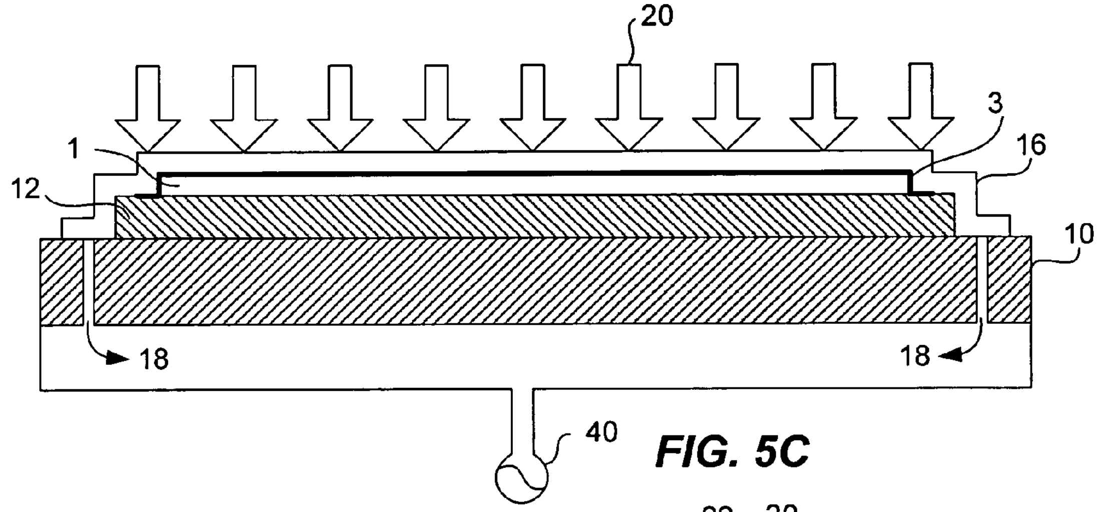

Continuous pressure is provided on the sheet against the substrate (step 406). Referring now to FIG. 5C, the clamping step of one embodiment of the present invention is explained. Membrane 16, having previously been positioned over the sheet-substrate-cooling device stack, as well as at least a portion of platen 10 including at least one and preferably a plurality of vacuum orifices 14, now exerts an atmospheric clamping pressure, as shown at 20. As used herein, the term "atmospheric clamping pressure" denotes the use of a pressure differential between the ambient atmosphere and the atmosphere beneath the membrane to effect the clamping of the substrate and sheet. This atmospheric clamping pressure may be affected by means of vacuum, air pressure, or a combination of the two.

In the embodiment under discussion, atmospheric clamping pressure 20 is attained by means of connecting at least one of a plurality of vacuum orifices 14 to a vacuum system 40, and thereby applying a vacuum, as shown at 18, to the underside of membrane 16. It should be noted that vacuum system 40 has been deleted from FIGS. 5A-B and D-H for purposes of illustrational clarity. Where a substantially perfect vacuum is obtainable at sea level, this theoretically results in a clamping force of approximately 14.7 psi over the entire surface of the sheet-substrate stack. Practically, a perfect vacuum is seldom obtainable and in any event is not generally necessary. Clamping forces equating to 14 psi resulting from less than perfect vacuum have been found to yield dye transfer images vastly superior to those obtainable by any other methodology. Depending upon the mechanical properties of the substrate, the dye transfer temperatures, and the nature of the thermal events occasioned by the application of the principles of the present invention, even lower clamping pressures may be utilized.

While the foregoing embodiment utilizes vacuum clamping, alternative embodiments utilize other means of attaining the very even clamping pressure afforded by vacuum clamping. These alternatives include, but are not necessarily limited to, the use of mechanical clamping pads incorporating a pressure-leveling layer, for instance foam rubber or sacrificial rigid foam sheets, and the use of air pressure clamps, for instance bag presses.

It should also be noted that clamping pressure, including the previously discussed vacuum clamping pressure, may serve as a processing control variable. For some imaging routines in some substrates, it may be advantageous to modify the clamping pressure above or below the nominal one atmosphere clamping pressure discussed above. Clamping pressures lower than one atmosphere may be attained and maintained by utilizing a vacuum regulator. Clamping pressures greater than one atmosphere may be attained by augmenting the vacuum clamping pressure with a supplementary clamping force. One methodology for attaining this latter option is by means of a bag press superimposed over the membrane; the inflated force of which bag press supplements the vacuum clamping attained by the membrane alone.

Figure 5D:
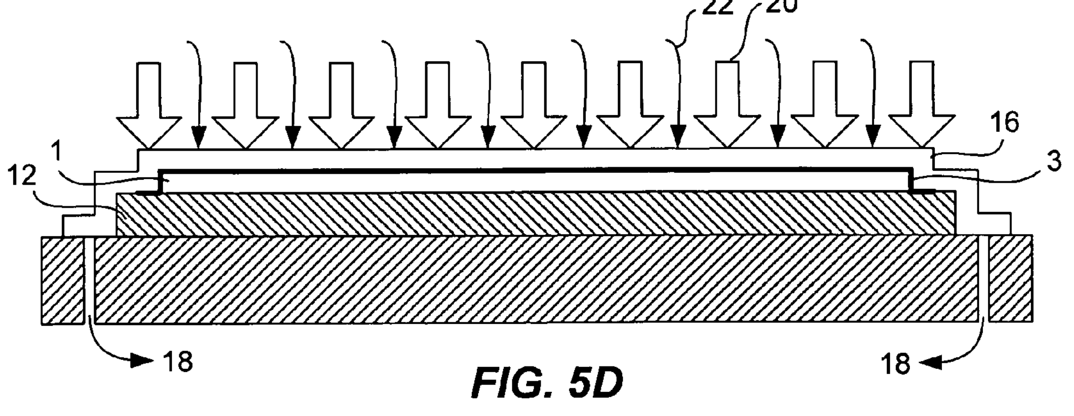

The treated sheet is heated to a sublimation temperature (step 408). Referring now to FIG. 5D, a first, or heating thermal event for forming a dye sublimation image is imposed on the membrane-sheet-substrate stack as follows: thermal energy is applied through membrane 16 and sheet 3 to substrate 1. In this embodiment of the present invention, it has been found advantageous not only in terms of manufacturing efficiency, but of efficacy of later removing sheet 3 from substrate 1, that thermal energy 22 be provided as rapidly as possible to substrate 1. Thermal energy 22 may be applied through membrane 16 in substantially any manner known to those having ordinary skill in the art that will not damage membrane 16. The previously applied atmospheric clamping force is maintained throughout this step.

Examples of applicable heat transfer methodologies include, but are specifically not limited to: electrical resistance heating, for instance by means of electrical resistance wires embedded in membrane 16, or applied either above or below membrane 16; by the application of steam to an upper surface of membrane 16; by the application to an upper surface of membrane 16 of a flow of heated gas including steam, flame or heated fluid; or by the application of radiant energy to the top of membrane 16. Examples of such radiant energy include, but are not limited to, infrared energy applied by means of infrared lamps, or ultraviolet radiation, and microwave radiation. Another alternative for applying thermal energy 22 is the application to an upper surface of membrane 16 of a conductive heating source, for instance a heated plate. Again, this plate may be heated by any known heating methodologies, such as those previously discussed, as well as by introducing into a hollow interior of the plate a flow of heated fluid or gas.

Plastics, for instance thermoplastics, have specifically different physical attributes depending upon their internal temperature. At room temperature, most commercially usable thermoplastics are substantially rigid, for instance as rigid sheets. At the other end of the temperature spectrum, heating a thermoplastic substantially above its forming temperature results in the substantial liquefaction of the plastic, with attendant destruction of the structure formed by the plastic as the plastic liquefies. Intermediate between these two extremes are temperatures at which the plastic begins to soften but is not yet fully liquid. It is at these intermediate temperatures that the dye sublimation process of the present invention is conducted.

In order to simultaneously render substrate 1 mechanically and chemically suitable for the introduction of dye, as well as to provide for the sublimation of imaging dyes from the solid to the vapor state, the temperature of the substrate, and hence the sheet, must be elevated beyond the plastic's rigid and generally impervious state to a state where the plastic begins to soften, and where the sublimation dyestuffs vaporize. In order to retain the structural integrity of the plastic, and to maintain the technical performance specifications of the plastic, it is necessary that it not be heated to the point where it liquefies. The ideal temperature is, of course, application specific and depends upon not only the type and thickness of plastic sheet to be imaged but also upon the nature of the imaging dyes.

The application of thermal energy 22 to raise the internal temperature of substrate 1 and sheet 3 comprises the first thermal event of the present invention. The duration of the first thermal event is again application specific and is determined empirically. One of the metrics for determining the duration of the first thermal event is the desired degree of penetration of the image into the plastic.

Figure 5E:
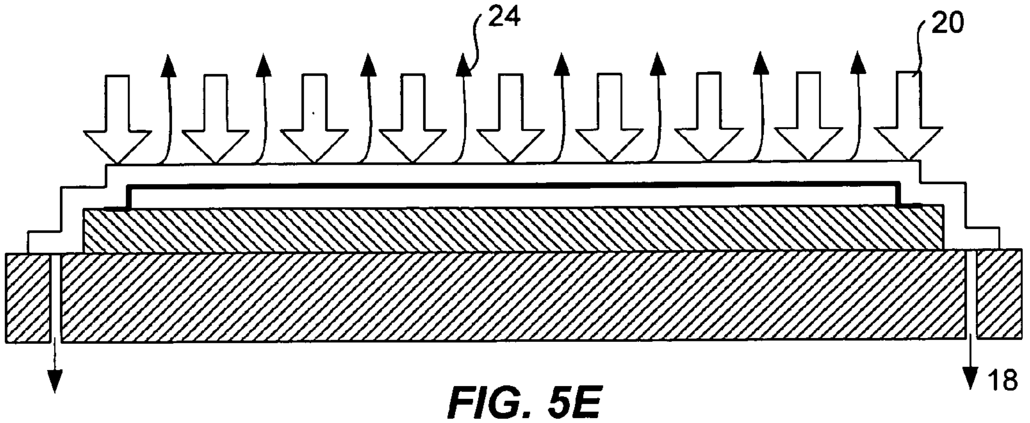

Referring now to FIG. 5E, following the first thermal event, which actually effects the dye sublimation imaging of the substrate 1, a second, or cooling thermal event is accomplished while the substrate and sheet remain under vacuum clamping pressure (step 412). Again, the previously applied vacuum 18 is maintained during the second thermal event that comprises the removal of thermal energy at 24. It has been found that a second, rapid cooling thermal event conducted under vacuum clamping pressure presents advantages over previous dye sublimation imaging technologies.

A first advantage accruing from this step is that the release of sheet 3 from substrate 1 is greatly improved over that of previous methodologies. Indeed, by carefully adjusting the temperature and duration of the first thermal event, in conjunction with the rapid cooling of the second thermal event, the unwanted adhesion of the treated sheet 3 to the substrate 1 has reduced. This is accomplished without the need for special intermediate dye transfer webs or time-consuming pre-imaging conditioning processes required by other methodologies.

A second advantage afforded by this step relates to the previously discussed problems of unwanted distortion of the substrate caused by the heating and cooling thereof without benefit of a strong, evenly applied clamping force over the entire surface of the substrate. Again not wishing to be bound by theory, it is believed that prior dye sublimation technologies, by inducing the heating and cooling of the substrate, liberate internal forces within an unconstrained substrate which, on cooling, tend to twist, shrink, and warp the substrate. By utilizing an atmospheric clamping methodology against a platen utilizing a tough, yet resilient membrane 16, for instance the vacuum clamping technology previously discussed, the present invention avoids this problem by forcing the retention of the substantially flat shape of the sheet throughout the several thermal events of the dye sublimation imaging process.

Figure 5F:
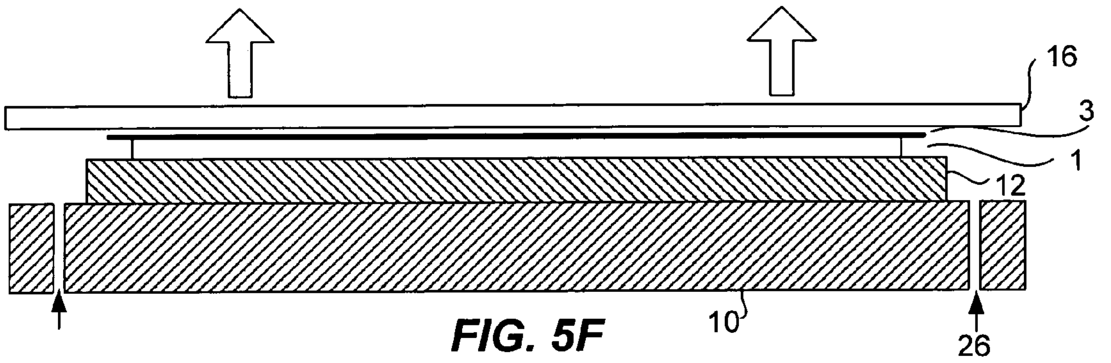
Figure 5G:
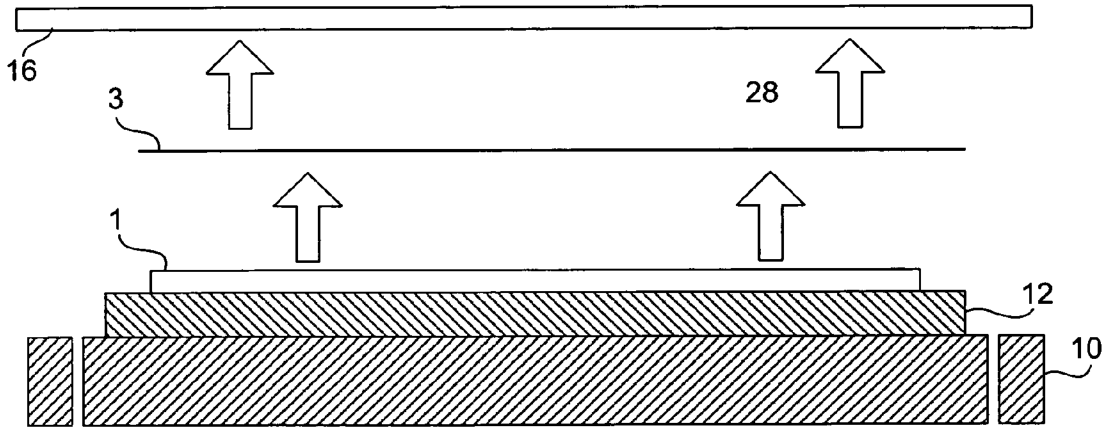
Figure 5H:
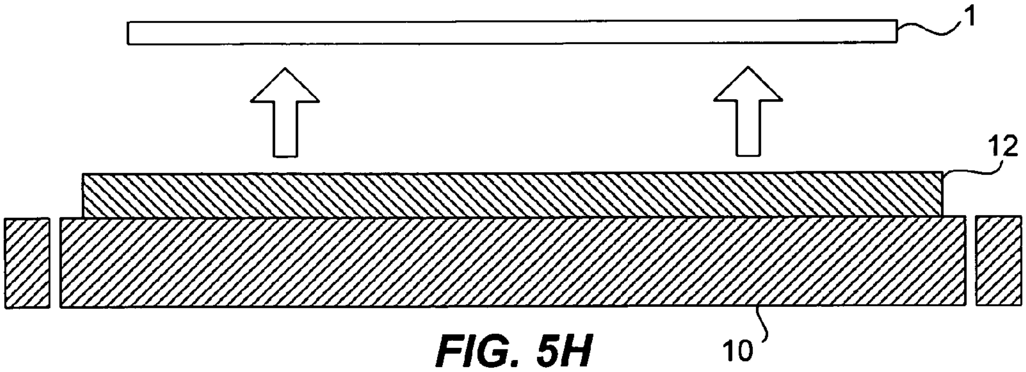

Referring now to FIGS. 5F-5H, at the completion of the second, cooling thermal event, vacuum is released at 26 and membrane 16 removed from the sheet-substrate stack at 28. Thereafter, sheet 3 and substrate 1 are lifted from passive cooling device 12. At this point, the image carried by sheet 3 has been formed within substrate 1. The degree of dye penetration within the plastic is dependent upon several factors. These include sublimation temperature, clamping pressure, and duration of application of thermal energy and clamping pressure.

A first apparatus for performing a methodology according to the present invention is disclosed having reference to FIGS. 6A-6C and 7. Dye transfer apparatus 600 includes a table assembly 602, at least one platen assembly 604, a thermal imaging unit 606, and a vacuum system 40. Table assembly 602 supports thermal imaging unit 606 and platen assembly 604. As will be discussed later, the utilization of a plurality of platen assemblies 604 presents advantages with respect to manufacturing efficiency. Accordingly, in one preferred embodiment of this apparatus, there are provided a pair of platen assemblies 604 and 604', which are substantially identical. Table assembly 602 is preferably equipped so that platen assemblies 604 and 604' may be introduced into thermal imaging unit 606 in rotation. In order to effect this insertion of platen assemblies 604 and 604', a system of rollers or slides may be implemented. These rollers are preferably formed as a series of rollers 620 on table assembly 602, across which platen assembly 604 and 604' slide. Alternatively, rollers or slides may be provided on the underside of platen assemblies 604 and 604'. Other sliding-friction reducing methods including air cushions, polished metal slides, and PTFE slides may, of course, be implemented.

Apparatus 600 is further equipped with a vacuum system 40. Vacuum system 40 includes a vacuum source, for instance a vacuum pump 642 and optionally a vacuum reservoir 644, which is connected by piping 645 to vacuum pump 642. This vacuum source is then connected by means of flexible piping 646 and vacuum valve 648 to platen assembly 604, and more particularly, to vacuum orifices 14 thereof. A similar set of piping and vacuum valves, 646' and 648', connects the vacuum source to platen assembly 604'. The actuation of vacuum valves 648 and 648' may be manual, remote, or automated. In a preferred embodiment of this apparatus, vacuum valves 648 and 648' are electrically controlled valves operated from a control station 700.

Figure 6A:
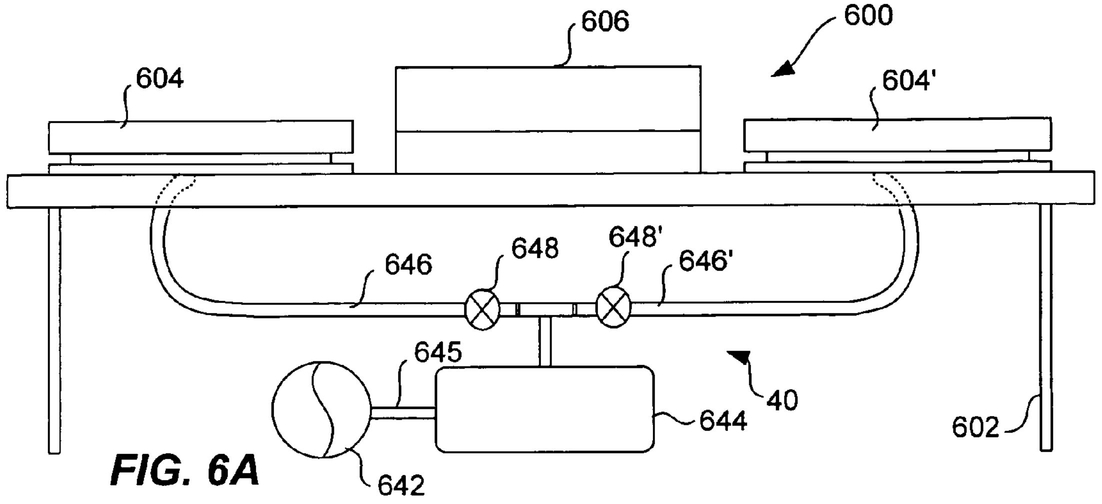
FIGS. 6A-C are frontal views of a first apparatus for performing the method of the present invention.
Figure 6B:
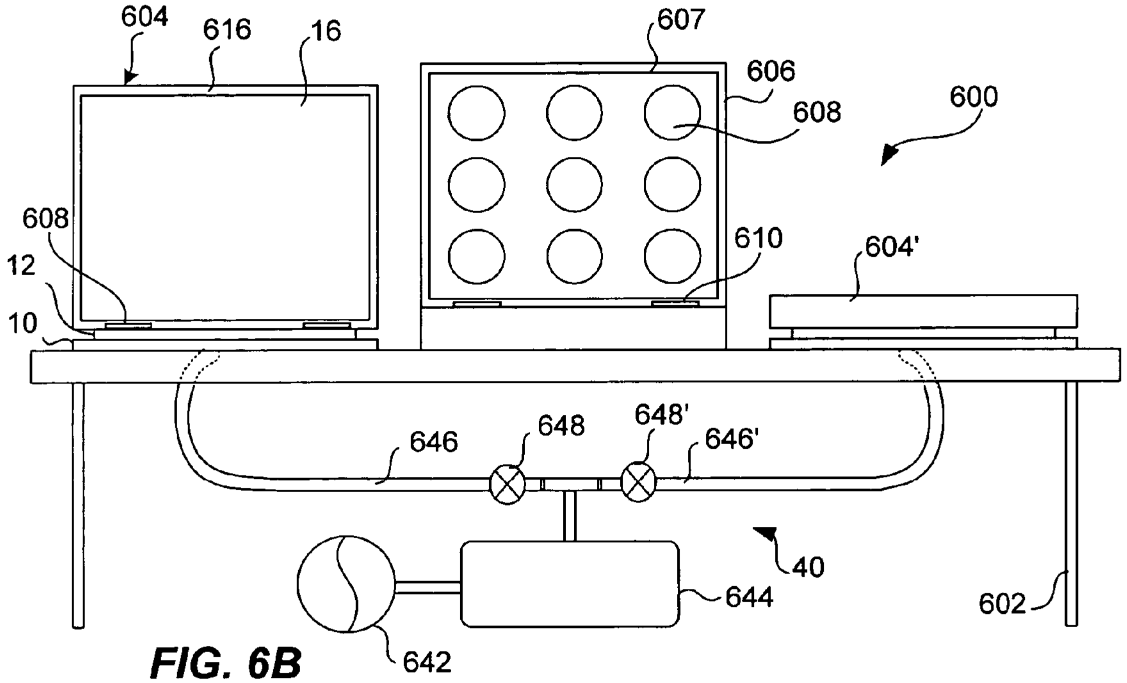

Referring now to FIG. 6B, details of thermal imaging unit 606 and platen assembly 604 are shown. Platen assembly 604 comprises a perforated aluminum platen 10, atop which is placed a passive cooling device 12. A frame, sometimes referred to herein as a "spectacle frame", 616 is hingedly attached at one side to platen 10 by means of hinges 608. Frame 616 has mounted thereto a sheet of elastomeric membrane 16, previously discussed, which membrane covers the aperture formed by the frame. In this embodiment of the present invention, membrane 16 takes the form of the textured sheet of DuPont Viton™.

Thermal imaging unit 606 in this embodiment is a substantially hollow box-like chassis 607 having mounted therein a heat source. This heat source may implement substantially any of the previously discussed heating methodologies, and in this embodiment of the present invention comprises at least one, and preferably a plurality of electrical infrared bulbs 609. Chassis 607 is hingedly attached to table assembly 602 by means of hinges 610 a suitable distance above the surface of table assembly 602 such that, when closed, thermal imaging unit 606 is positioned flushly atop platen assembly 604 when chassis 607 is lowered onto platen assembly 604.

Figure 6C:
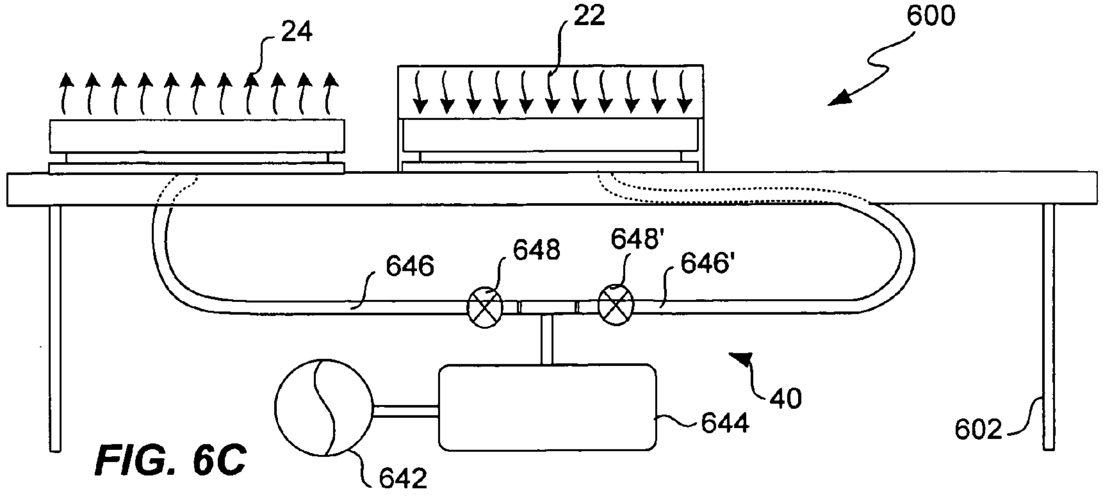
Figure 7:
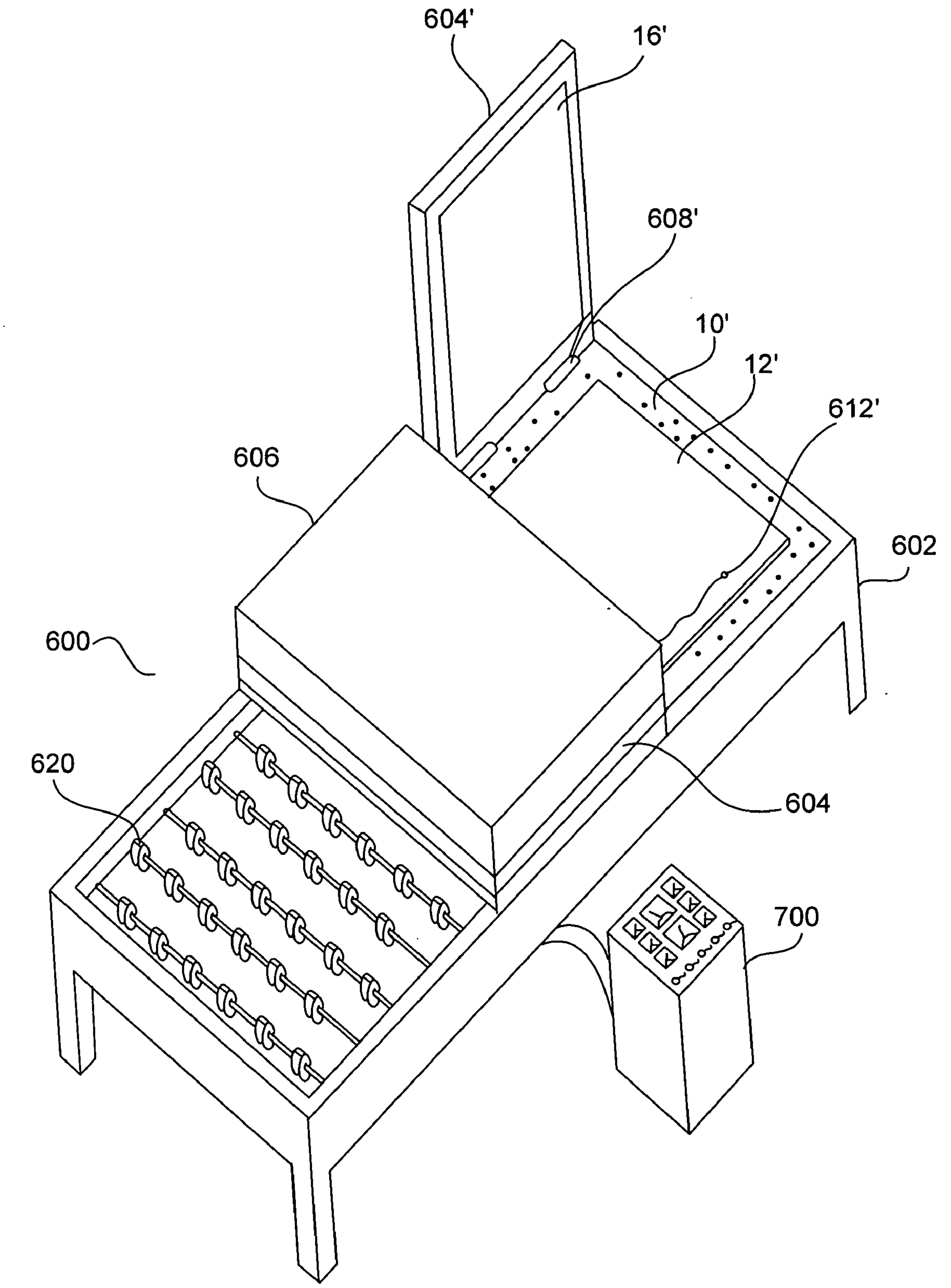
FIG. 7 is a perspective view of the first apparatus for performing the method of the present invention.

The operation of apparatus 600 is further described having reference to FIGS. 6B-C. At the start of one imaging cycle, frame 616 is opened as shown at the left side of FIG. 6B, and a sheet of plastic substrate 1 is inserted atop cooling device 12. Thereafter, a treated sheet 3 having a dye image 5 imprinted thereon is positioned such that dye image 5 is in direct contact with substrate 1. Dye image 5 may be advantageously formed by imprinting the image, utilizing substantially any known dye sublimation dyestuff, onto one surface of sheet 3. Thereafter, frame 616 is closed over the sheet-substrate-cooling device stack substantially as shown at the right side of FIG. 6B. Thereafter, vacuum valve 648 is opened, causing vacuum system 40 to evacuate the area under membrane 16. This evacuation seals membrane 16 to platen 10 and the previously discussed stack, and provides an atmospheric clamping force to effect the dye transfer process. It also acts to maintain the registration of the sheet 3 with respect to substrate 1, and in novel fashion to preclude the unwanted distortion of substrate 1, as previously discussed.

Once suitable vacuum clamping force has been obtained, platen assembly 604 is slidably positioned beneath chassis 607 of thermal imaging unit 606, and chassis 607 is positioned on top of platen assembly 604. It should be noted that the hinged elevation and lowering of both chassis 607 of thermal imaging unit 606, and frame 616 of platen assembly 604, may be manually performed, or advantageously may be performed by any lifting methodology known to those having skill in the art. These lifting methodologies include, but are specifically not limited to, pneumatic cylinders, hydraulic cylinders, servo motors, spring devices, counter weights, screw or geared devices and all other elevating and depression methodologies known to those having ordinary skill in the art.

After chassis 607 is lowered onto platen assembly 604, infrared bulbs 609 are energized causing the heating 22 of membrane 16, sheet 3 and substrate 1, while sheet 3 and substrate 1 remain under the previously discussed clamping vacuum. The temperature beneath membrane 16 may be monitored by means of one or more thermocouples 612 positioned between passive cooling device 12 and membrane 16. Alternative temperature monitoring methodologies known to those of ordinary skill in the art may, of course, be implemented. Infrared bulbs 609 remain energized for a specified time empirically determined to be optimal for the substrate, sublimation dyestuff, and degree of dye transfer imaging desired.

Once the specified thermal imaging time has elapsed, infrared bulbs 609 may be de-energized, chassis 607 is elevated, and platen assembly 604 is removed from under chassis 607 while a vacuum is retained under membrane 16. The advantages of an embodiment of this apparatus having two platen assemblies 604 and 604' are now shown. While platen assembly 604 is cooled under vacuum clamping at 24, platen assembly 604', having been previously loaded and vacuum clamped, is positioned under chassis 607 of thermal imaging unit 606. Chassis 607 is then lowered onto frame 616 of platen assembly 604' and the heat source, for instance infrared bulbs 609, may again be energized. Accordingly, one of platen assemblies 604 and 604' is cooling while the other is heating, while both retain their respective substrate/sheet stacks under clamping pressure.

In this embodiment of the present invention, which implements a passive cooling device, cooling 24 is accomplished by exposing platen assembly 604 to ambient air temperature. This exposure may be augmented by introducing a flow of ambient air across the surface of platen assembly 604, and most especially across membrane 16 by means of a fan or other airflow-inducing device. Passive cooling device 12 serves to passively cool substrate 1, sheet 3 and at least a portion of membrane 16 in the following manner: being of very low thermal mass, passive cooling device retains little unwanted heat. Once the first thermal event is complete, and the second thermal event commenced, passive cooling device 12, contributing little additional overhead, enables the rapid cooling of the membrane and the elements under it.

Again, the temperature beneath membrane 16 is monitored by means of thermocouple 612' (FIG. 7) until substrate 1 has reached a temperature sufficiently cool to return it to its rigid state without distortion. Thereafter, vacuum valve 648 is actuated to relieve the vacuum beneath membrane 16, thereby releasing the clamping pressure to substrate 1 and sheet 3. Once clamping pressure is released, substrate 1 and sheet 3 may be removed from platen assembly 604 after lifting frame 616 therefrom. By using two platen assemblies, for instance 604 and 604', to alternatively heat and cool the substrate in this manner, imaging throughput is nearly doubled.

In one application of this embodiment of the present invention, an 80 mil thermoplastic sheet was utilized as substrate 1. The thermoplastic sheet was imaged by positioning it on passive cooling device 12, and then superimposing a treated sheet 3 thereover, as shown. Spectacle frame 616 was then lowered over the thermoplastic sheet and treated sheet 3, covering them with membrane 16. In this embodiment, a silicone rubber sheet was implemented as membrane 16. After evacuation of the space under membrane 16, processing proceeds as previously discussed for this embodiment. In this case, the thermoplastic sheet was processed for 10 minutes at a temperature of 350° F. After this first thermal event, cooling proceeded as previously discussed.

From the preceding discussion of imaging times, clamping pressures, imaging temperatures, and cooling times, it will be appreciated that the principles enumerated herein are applicable over a wide range of these variables. While the specifics of any given imaging regime are both highly specific and empirically determinable, in general terms, the present invention contemplates imaging temperatures for most plastic substrates at temperatures between 200° F.-600° F.; more particularly between 225° F. and 400° F., and more particularly still at temperatures between 250° F. and 370° F.

Similarly, imaging times of between 15 seconds and 12 hours have been shown to be advantageous for some embodiments of the present invention. More specifically, imaging times of between one minute and one hour may be implemented with advantage. Still more particularly, imaging times between 90 seconds and 15 minutes have been found satisfactory for some imaging regimes.

In like fashion, imaging pressures equating from 0.25 atmospheres to 20 atmospheres may be utilized to advantage. More particularly, such pressures from 0.5 to 5 atmospheres, and still more particularly, imaging pressures of 0.7 to 1.5 imaging pressures are satisfactory for a wide variety of plastic substrates.

After the substrate has been cooled below the glass transition temperature, the clamping pressure may be removed, and the image carrier may be removed from the substrate. Cooling the substrate to a temperature below the glass transition temperature before the pressure is removed may allow the clamping pressure to prevent warping and may allow the image carrier to be more easily removed from the substrate.

Figure 8:
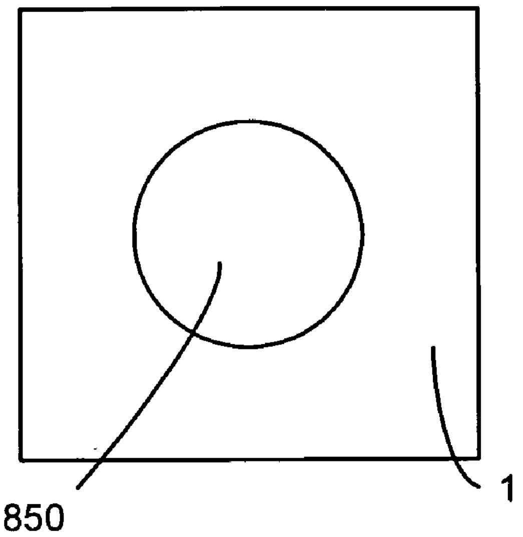
FIG. 8 is a top schematic view of a substrate and image.
Figure 9:
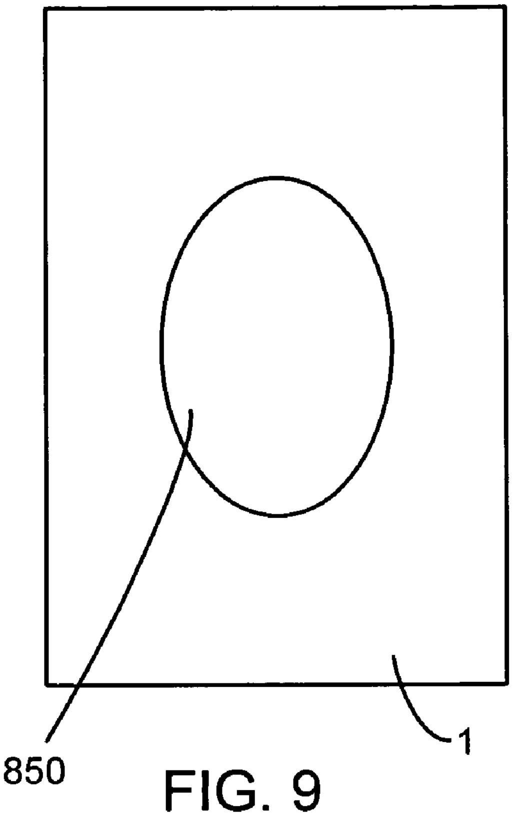
FIG. 9 is the top schematic view of the substrate and image after thermal forming.
Figure 10:
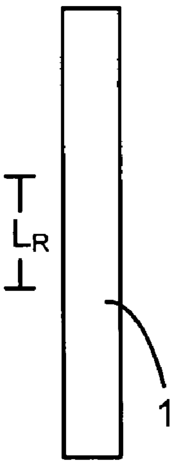
FIG. 10 is a side view of a substrate.
Figure 11:
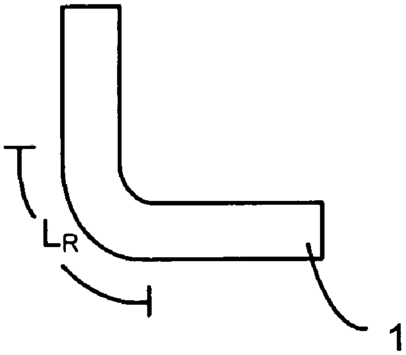
FIG. 11 is the side view of the substrate after thermal forming.

The substrate subsequently may be reheated to a temperature between 275° F. and 400° F. to allow thermal forming of the substrate. The substrate may be thermal formed where an elongation of more than 40% of a region of the substrate may occur. An elongation of up to 60% would not cause the image at the region of elongation to thin appreciably (significantly reduce the intensity of the image). FIG. 8 is a top view of a resulting substrate 1 with an image 850. The substrate 1 may be heated above the glass transition temperature, thermal form elongated, and then cooled. FIG. 9 shows the substrate 1 after it has been heated and thermal form elongated about 50%. A 50% elongation is defined as having a final length about 50% greater than the original length. The image 850 has also undergone an elongation. Since the sublimated images can be dyed several millimeters into the substrate, it is believed that the elongated image will have at least 75% of the intensity as the original image. It is believed that such elongation will not significantly reduce image intensity (thin), so that the intensity of the elongated image may even be greater than 90% or 99% of the original image intensity. FIG. 10 is a side view of a substrate 1 with a region length $L_R$. The substrate 1 is heated above the glass transition temperature and thermal form bent, so that the region length $L_R$ is increased by more than 50%, as shown FIG. 11. The invented sublimated image in this region does not significantly reduce image intensity.

The provision of a continuous pressure from the heating region to the cooling region may help to provide the desired image. Without being bound by theory, it is believed that, since the pressure is not removed as the substrate and image carrier passes from a heated region to a cooling region, the image quality is improved. It is further believed that, if the pressure is removed and then reapplied as the substrate and image carrier pass from the heating region to the cooling region, the image quality would be reduced and it may be more difficult to remove the sheet from the substrate. It is further believed that the continuous pressure helps to keep the substrate from shrinking, enlarging, extruding, or warping in at least one direction and in possibly all directions. Shrinking, enlarging, extruding, and warping may also be limited by the lower temperature and lower pressure required by the invention. The continuous pressure may also be useful in keeping the relative positioning between the substrate and the sheet during the heating and cooling cycles.

Figure 12:
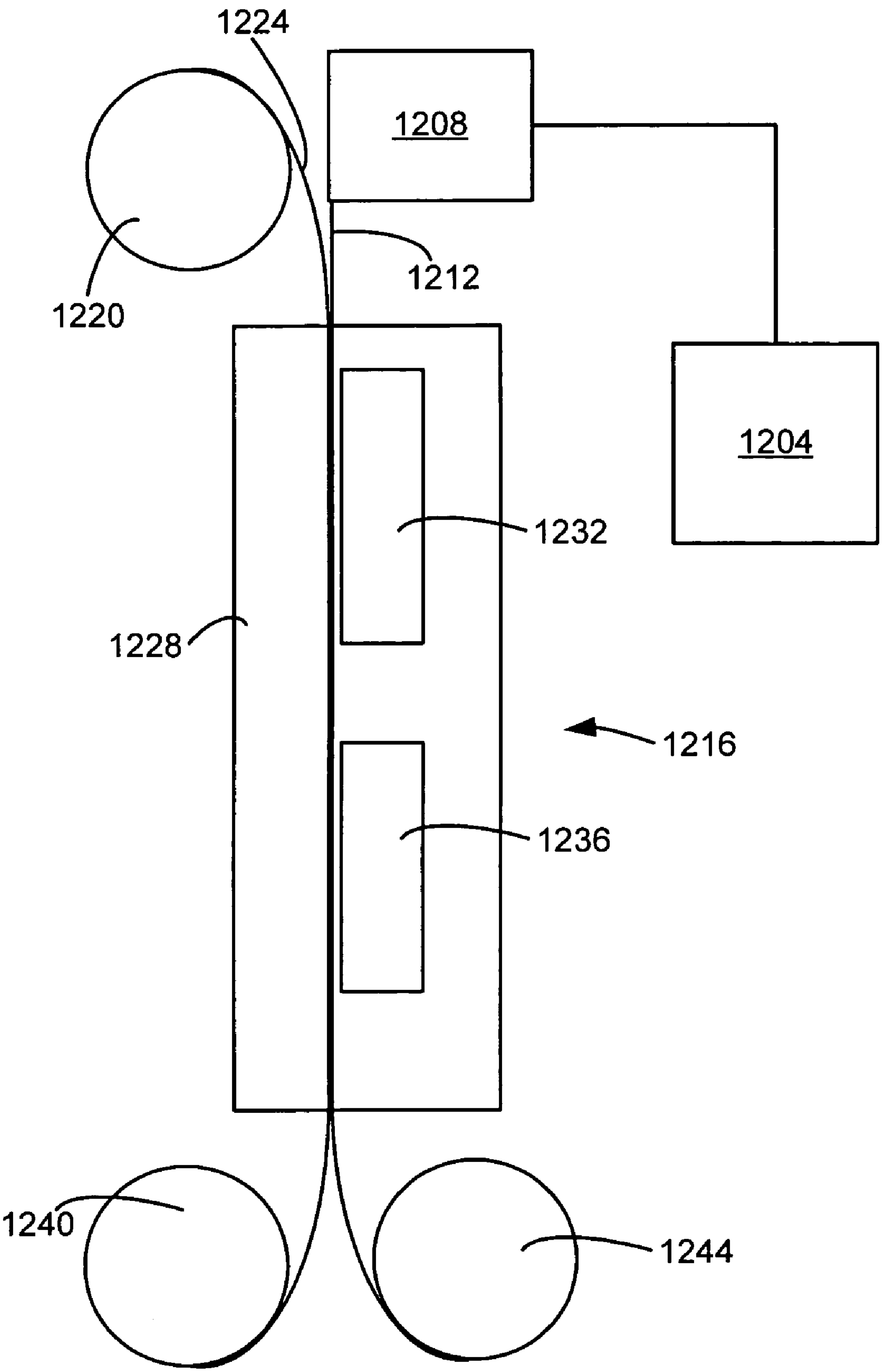
FIG. 12 is a schematic view of a continuous processing system.

FIG. 12 is a schematic illustration of an apparatus used in another embodiment of the invention. A computer system 1204 provides print commands to a computer printer 1208.

The computer printer 1208 may be an ink jet printer or a laser printer or some other computer printer, which is able to print a digital image from the computer to create an image of dye sublimation dyes on a treated sheet 1212. In this embodiment, the printer 1208 is fast enough to provide a sheet that is fed directly into a continuous image transfer system 1216. A feed roll 1220 of a substrate film 1224 provides the substrate film 1224 to the continuous image transfer system 1216. The substrate film 1224 and the treated sheet 1212 are pressed together with a continuous pressure by a continuous pressure system 1228. In a first part of the continuous pressure system 1228, the substrate 1224 and treated sheet 1212 are heated to a sublimation temperature, which is a temperature above the substrate's glass transition temperature by a heater 1232. The substrate 1224 and treated sheet 1212 then move to a second part of the continuous pressure system 1228, where the substrate 1224 and treated sheet 1212 are cooled to a temperature below the substrate's 1224 glass transition temperature by a cooler 1236. The substrate 1224 and the treated sheet 1212 are then removed from the continuous pressure system 1228, where the substrate 1224 is separated from the treated sheet 1212 and the substrate 1224 is placed on an output roller 1240. The spent treated sheet may also be collected on a carrier output roll 1244. As described above, the continuous pressure system 1228 provides a continuous pressure from before the heating until after the cooling. The carrier output roll 1244 may be powered and used to help convey the substrate and sheet through the continuous pressure system 1228, making the carrier output roll 1244 part of a conveyor.

Ink jet printers are able to provide inexpensive images of dye sublimation ink. Images printed on a computer printer, such as an ink jet printer, allow a user to not need to store and transport any sheet with an image. Instead, the image may be placed on the sheet on demand. Since dye sublimation inks printed on a sheet are perishable, being influenced by humidity and temperature, it is desirable to not need to store and transport such items. Large numbers of digital images may be stored on the computer 1204 or transferred to the computer and may be manipulated and combined by the computer for a customized image, allowing the system to provide a large number of available images that may be sublimated into the substrate with no inventory requirement. The computer printer is able to print the different digital images and customized digital images on the computer to the sheet.

A list of thermoplastic substrates that may be used in the above embodiments comprises, PVC, PVF, PET, PBT, polyesters, polycarbonates, acrylic alloys, Lexan™ by GE, Valox™ by GE, Atoglas Solar Kote™, Plexiglas™, Tedlar™ by Dupont, and Korad™ Polymer Extruded Products (Spartech).

From the foregoing discussion of several embodiments of the present invention, the ordering or spatial arrangement of the several elements of these embodiments was presented. It will be appreciated that these are by way of illustration and not limitation, and the present invention specifically contemplates modifications thereto.

Finally, while certain plastic substrates have been presented as examples herein, the present invention has been found to be useful for imaging a vast array of different plastics. Accordingly, the principles of the present invention specifically contemplate the application thereof to a wide variety of thermoplastics, and the examples presented herein are by way of illustration and not limitation.

In various embodiments, a continuous pressure is applied from before the heating until after the cooling. Some of these embodiments using continuous pressure are described in the previously mentioned U.S. Pat. No. 6,814,831, which is incorporated by reference. In other embodiments, the pressure is not continuous. In addition, various embodiments may heat the sheet to a temperature below the glass transition temperature of the substrate.

While this invention has been described in terms of several preferred embodiments, there are alterations, modifications, permutations, and various substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and various substitute equivalents as fall within the true spirit and scope of the present invention.

What is claimed is:

1. A method for forming a dye sublimation image in a plastic substrate with a sheet having an image formed thereon of a sublimatic dyestuff and with a treatment that deposits a silicon compound on the sheet, the method comprising:
- placing the image on the sheet with the treatment against a first surface of the substrate;
- heating the sheet to a sublimation temperature, which causes the image of the sheet to sublimate into the substrate, wherein the image is sublimated into the first surface of the substrate;
- cooling the sheet to a release temperature; and
- removing the sheet from the substrate, wherein the plastic substrate is a thermoplastic substrate.

2. The method, as recited in claim 1, wherein the sheet with the surface treatment that deposits the silicon compound provides a dry weight of silicon compound to paper of greater than 0.05%.

3. The method, as recited in claim 1, further comprising placing an image on the sheet with the treatment, which is a treated sheet.

4. The method, as recited in claim 3, wherein the placing the image on the treated sheet comprises passing the treated sheet through a printer, which prints the image on the treated sheet.

5. The method, as recited in claim 3, further comprising:
- selecting an image on a computer; and
- sending a command from the computer to a printer, wherein the placing the image on the treated sheet comprises passing the treated sheet through the printer, which prints the image on the treated sheet.

6. The method, as recited in claim 5, wherein the printer is an ink jet printer.

7. The method, as recited in claim 6, wherein the treated sheet is a sheet of paper with the treatment that deposits the silicon compound.

8. The method, as recited in claim 7, further comprising treating a sheet to obtain the sheet with a treatment, comprising:
- forming a coating of the silicon compound on surfaces of the sheet;
- drying the coating, wherein the dried coating of the silicon compound on the sheet has a weight of a silicon compound to paper of between 0.05% to 5.0%.

9. The method, as recited in claim 8, wherein the sheet has an additional treatment in addition to the treatment that deposits the silicon compound.

10. The method, as recited in claim 9, wherein the additional treatment provides a carboxymethyl cellulose additive to the paper.

11. The method, as recited in claim 1, wherein the sheet with a treatment is a sheet of paper with the treatment that deposits the silicon compound.

12. A method for forming a dye sublimation image in a plastic substrate comprising:

treating a sheet of paper with a treatment that deposits a silicon compound;

placing an image on the treated sheet of paper;

placing the image on the treated sheet against a first surface of the substrate, wherein the plastic substrate is a thermoplastic substrate;

heating the treated sheet to a sublimation temperature, which causes the image of the treated sheet to sublimate into the substrate;

cooling the treated sheet to a release temperature; and removing the treated sheet from the substrate.

13. The method, as recited in claim 12, wherein the treating the sheet of paper with the treatment that deposits the silicon compound provides a dry weight of silicon compound to paper of greater than 0.05%.

14. The method, as recited in claim 13, further comprising:

selecting an image on a computer; and sending a command from the computer to a printer, wherein the placing the image on the sheet comprises passing the treated sheet through the printer, which prints the image on the treated sheet.

15. The method, as recited in claim 14, wherein the printer is an ink jet printer.

16. A method for forming a dye sublimation image in a thermoplastic substrate comprising:

treating a sheet of paper with a treatment that deposits a silicon compound, wherein the treating the sheet of paper, comprises:

forming a coating of a silicon compound on surfaces of the sheet of paper; and drying the coating of silicon compound, wherein a weight of the coating of silicon compound is between 0.05% to 5.0% of a weight of the sheet of paper;

placing an image on the treated sheet of paper;

placing the image on the treated sheet against a first surface of the substrate;

heating the treated sheet to a sublimation temperature, which causes the image of the treated sheet to sublimate into the substrate;

cooling the treated sheet to a release temperature; and removing the treated sheet from the substrate.

* * * * *